United States Patent Office 3,484,445
Patented Dec. 16, 1969

3,484,445
DERIVATIVES OF CHROMONE-2-CARBOXYLIC ACID
Thomas Brian Lee and Richard Templeton, Holmes Chapel, England, assignors to Fisons Pharmaceuticals Limited, Loughborough, England
No Drawing. Filed Dec. 21, 1966, Ser. No. 603,459
Claims priority, application Great Britain, Dec. 21, 1965, 54,233/65
Int. Cl. C07c 7/34; A61k 27/00
U.S. Cl. 260—294      9 Claims

ABSTRACT OF THE DISCLOSURE

Certain chromone derivatives of the formula

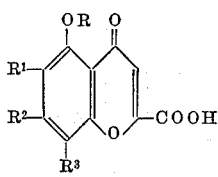

and physiologically acceptable salts, ester and amides thereof, wherein R is a member selected from the group consisting of alkyl substituted by at least one member selected from the group consisting of halogen and aryl and of alkenyl; and $R^1$, $R^2$ and $R^3$ are each selected from the group consisting of hydrogen, halogen, lower alkyl and OR in which R has the meaning defined above; or $R^1$ and $R^2$ or $R^2$ and $R^3$ together with the adjacent carbon atoms form a saturated or unsaturated carbocyclic ring or oxygen-containing heterocyclic ring, have been found to possess activity as inhibitors of certain types of antigen-antibody reactions.

---

This invention is concerned with new chromone derivatives and pharmaceutical compositions containing them.

It has now been found that certain chromone derivatives, as hereinafter defined, possess activity as inhibitors of the effects of certain types of antigen-antibody reaction.

According to the invention, therefore, there are provided as new compounds, chromone carboxylic acids of the formula:

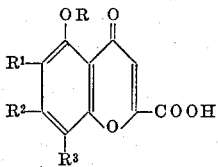

and salts esters and amides thereof, in which R is an alkyl group (e.g. a methyl, ethyl, propyl or butyl group) substituted by one or more halogen atoms, e.g. chlorine atoms, or aryl (e.g. phenyl) groups or R is an alkenyl (e.g. butenyl) group; and $R^1$, $R^2$ and $R^3$ are the same or different and each is a hydrogen or a halogen atom (for example a chlorine or bromine atom), a lower alkyl group (for example a methyl or ethyl group), or a group OR where R has the meaning defined above; or $R^1$ and $R^2$ or $R^2$ and $R^3$ together with the adjacent carbon atoms form a saturated or unsaturated carbocyclic ring or an oxygen-containing heterocyclic ring, for example a benzene, cyclohexane, cyclopropane or furo ring.

Salts of the chromone-2-carboxylic acids which may be mentioned are salts with physiologically acceptable cations, for example metal salts such as alkali metal salts (e.g. sodium, potassium and lithium salts) and alkaline earth metal salts (e.g. magnesium and calcium salts) and salts with organic bases, e.g. amine salts such as piperidine, triethanolamine and diethylaminoethylamine salts.

Amides which may be mentioned include simple amides with ammonia and monoalkylamines and dialkylamines, and more complex amides with amino acids such as glycine.

The new chromone derivatives according to the invention have been shown to inhibit the release and/or action of toxic products which arise from the combination of certain types of specific antigen and antibody, e.g. the combination of reaginic antibody with specific antigen. Thus the new compounds are of value in the treatment of conditions in which antigen-antibody reactions are responsible for disease, for example, asthma, hay fever, urticaria and auto immune diseases.

In man it has been found that both subjective and objective changes which result from the inhalation of specific antigen are inhibited by prior administration of the new chromone derivatives which are thus of value in the prophylactic treatment of asthma.

According to a further embodiment of the invention, therefore, there is provided a pharmaceutical composition comprising a chromone derivative according to the invention in association with a pharmaceutical carrier or diluent.

The nature of the composition and the pharmaceutical carrier or diluent will, of course, depend upon the desired route of administration, i.e. orally, parenterally or by inhalation.

In general, for the prophylactic treatment of asthma, the composition will be in a form suitable for administration by inhalation. Thus the composition may comprise a suspension or solution of the active ingredient in water for administration by means of a conventional nebulizer. Alternatively the compositions may comprise a suspension or solution of the active ingredient in a conventional liquefied propellant, such as dichlorodifluoromethane or chlorotrifluoroethane, to form a so-called "aerosol" composition to be administered from a pressurized container. The compositions may also comprise the solid active ingredient diluted with a solid diluent, e.g. lactose, for administration from a powder inhalation device.

The pharmaceutical compositions of the invention generally comprise a minor proportion of active chromone ingredient and a major proportion of carrier or diluent. Thus, for example, the solutions for administration by a conventional nebulizer will comprise a dilute solution, e.g. containing up to about 10% of the active ingredient in sterile water, and compositions comprising suspensions or solutions in pressurized propellants will contain, for example, about 2–5% of the active ingredient. However, where the composition comprises the solid actitve ingredient diluted with a solid diluent, the diluent may be present in less, equal or greater amount than the solid active ingredient, for example the diluent may be present in an amount of from 50 to 150% by weight of the solid active ingredient.

The invention also includes within its scope a method of inhibiting the effects of the antigen-antibody reaction which comprises the prior application to the area of the antigen-antibody mechanism a therapeutically effective amount of a chromone derivative as defined above, preferably in the form of a salt.

According to a particular embodiment, the invention is for a method of relieving or preventing allergic airway obstruction which comprises administering to the patient a therapeutically effective amount at suitable intervals, of a chromone derivative as defined above, particularly in the form of a salt.

The new chromone derivatives according to the invention may be prepared in various ways.

Thus, for example, they may be prepared by cyclizing by heating, if desired in the presence of a cyclization catalyst, an alpha-gamma-diketo-ester of the formula

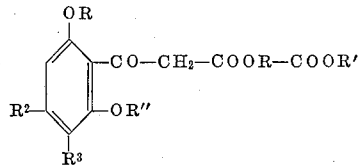
(II)

in which R' is a lower alkyl group and R" is a hydrogen atom or a lower alkyl group, and thereafter, if desired, hydrolyzing the ester, if formed, to yield the desired acid.

The cyclization may be effected directly by heating the alpha-gamma-diketo ester i the absence of any cyclization catalyst in the preesnce of a solvent such as anhydrous glycerol. Alternatively the cyclization may be carried out by heating in the presence of a solvent such as glacial acetic acid, containing a small amount of hydrochloric or hydrobromic acid, concentrated sulphuric acid, a solution of sodium acetate in boiling acetic acid or in the presence of ethanol containing a small amount of hydrogen chloride.

The alpha-gamma-diketo ester of Formula II may be prepared in a number of ways, for example by the condensation of a dialkyl oxalate, e.g. diethyl oxalate, with an acetophenone of the formula:

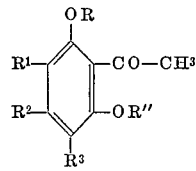
(III)

in the presence of a condensation catalyst such as sodium ethoxide, sodamide or sodium hydride; or by the condensation of a pyruvate ester of the formula:

$$CH_3—CO—COOR^1 \quad (IV)$$

with a benzoic acid ester of the formula:

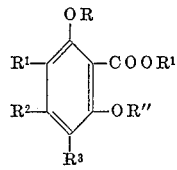
(V)

desirably in the preence of a condensation catalyst.

The new compounds according to the invention may also be prepared by reacting an acetophenone of the formula:

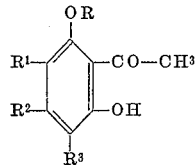
(VI)

with a substantially equimolecular amount of a substituted dihalo-acetic acid of the formula:

$$R'—O—C(X)_2—COOR' \quad (VII)$$

in which X is a halogen atom, e.g. a chlorine atom, in the presence of a finely divided metal catalyst of the platinum group of metals. Alternatively the new compounds may be prepared by the reaction of an acetophenone of Formula VI with an ester of the formula:

$$X—CO—COOR^1 \quad (VIII)$$

in the presence of an acid binding agent such as pyridine.

The new chromone-2-carboxylic acids of the invention may also be prepared by oxidation of the corresponding 2-formyl, 2-methyl, 2-hydroxymethyl or 2-styryl chromones. Further, they may be prepared by hydrolysis of the corresponding 2-cyano chromone or by dehydrogenation of the corresponding chromanone-2-carboxylic acid.

The new chromone-2-carboxylic acids may also be prepared by reaction of acetylene dicarboxylic acid with a phenol of the formula:

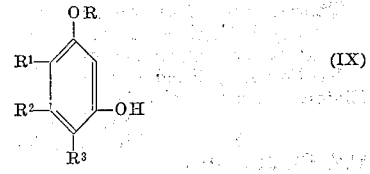
(IX)

in the presence of an excess of polyphosphoric acid, or by reaction of acetylene dicarboxylic acid with an alkali metal phenate of the formula:

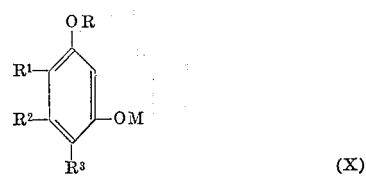
(X)

to yield a product of the formula:

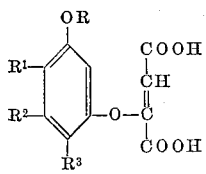
(XI)

which may be subsequently cyclized to the desired acid.

According to another embodiment of the invention, the new chromone derivatives may be prepared by reaction of an appropriately substituted 5-hydroxy-chromone-2-carboxylic acid or an ester thereof with a compound of the formula RX, wherein X is a halogen atom and R has the meaning defined above, in an inert solvent in the presence of an acid binding agent such as potassium carbonate.

Where R is an alkali group substituted by one or more halogen atoms, this may be prepared, for example, by treatment of the corresponding compound in which R is an alkali group substituted with one or more hydroxy groups with a halogenating agent such as thionyl chloride or phosphorus oxychloride.

The chromone-2-carboxylic acids obtained by the above mentioned processes may be subsequently converted to their salts, esters or amides by well known methods. Thus, salts of the acids may be prepared by reaction of the acids with basic metal or ammonium compounds such as alkali metal or ammonium hydroxide or carbonate. Esters may be prepared by direct reaction of the acid with the requisite alcohol and amides by reaction of a suitable acid derivative, e.g. the acid halide, with the corresponding amine. In general it is preferred to employ the acids in the form of salts, such as alkali metal salts, or amides, especially as complex amides with amino acids such as glycine. Such amides may be employed as the free bases or as acid addition salts thereof.

In order that the invention may be well understood the following examples are given by way of illustration only. In the examples all parts and percentages are by weight unless otherwise stated.

EXAMPLE 1

A mixture of 5-(2-hydroxyethoxy)-chromone-2-carboxylic acid (1 part) and thionyl chloride (2 parts) is warmed gently on a steam-bath for 2 hours. The mixture is then cooled and poured into ice-water with stirring. The crude solid which separates is filtered off and after drying is recrystallized from ethyl acetate to yield 5-(2-chloroethoxy)-chromone-2-carboxylic acid (0.5 part) melting between 209 and 212° C.

Analysis.—For $C_{12}H_9O_5Cl$. Found: C, 54.3%; H, 3.34%. Requires: C, 53.6%; H, 3.38%.

EXAMPLE 2

A suspension of 1 part of the acid from Example 1 is stirred with a cold aqueous solution of an equivalent amount of sodium bicarbonate until the solution is complete. This solution is then filtered and freeze-dried to yield 1 part of sodium 5-(2-chloroethoxy)-chromone-2-carboxylate.

EXAMPLE 3

5-(2-hydroxypropoxy)-chromone-2-carboxylic acid is reacted with thionyl chloride as described in Example 1 to yield 5-(2 - chloropropoxy)-chromone-2-carboxylic acid. The acid is then converted to sodium 5-(2-chloropropoxy)-chromone-2-carboxylate by reaction with sodium bicarbonate as described in Example 1.

EXAMPLE 4

A mixture of 5-(2,3-dihydroxypropoxy)-chromone-2-carboxylic acid and thionyl chloride is gently warmed for several hours. The reaction product is then recovered as described in Example 1 to yield 5-(2,3-dichloropropoxy)-chromone-2-carboxylic acid, which is subsequently converted to the sodium salt by reaction with sodium bicarbonate.

EXAMPLE 5

5 - (2 - hydroxypropoxy) - 7 - methyl - chromone - 2 - carboxylic acid is reacted with thionyl chloride as described in Example 1 to yield 5-(2-chloropropoxy)-7-methyl-chromone-2-carboxylic acid.

This acid is then converted to its sodium salt by reaction with sodium bicarbonate as described in Example 1.

EXAMPLE 6

A mixture of 5-(2-hydroxyethoxy)-7-methyl-chromone-2-carboxylic acid and thionyl chloride is warmed gently on a steam-bath for about two hours. The mixture is then cooled and poured into ice-water with stirring. The crude solid which separates is filtered off and, after drying, is recrystallized (from ethyl acetate) to yield 5-(2-chloroethoxy)-7-methyl-chromone-2-carboxylic acid.

The 5 - (2-chloroethoxy)-7-methyl-chromone-2-carboxylic acid is then converted to its sodium salt by reaction with sodium bicarbonate as described in Example 2.

EXAMPLE 7

6,8 - dichloro - 5 - (2 - hydroxyethoxy) - 7 - methyl-chromone-2-carboxylic acid is reacted with thionyl chloride as described in Example 1 to yield 6,8-dichloro-5-(2-chloroethoxy) - 7 - methyl - chromone-2-carboxylic acid, which acid is subsequently converted to its sodium salt by reaction with sodium bicarbonate as described in Example 2.

EXAMPLE 8

A mixture of 5,7-bis(2-hydroxyethoxy)-chromone-2-carboxylic acid and thionyl chloride are reacted together and the product separated as described in Example 1 to yield 5,7-bis(2-chloroethoxy)-chromone - 2 - carboxylic acid. The acid is then converted to its sodium salt by reaction with sodium bicarbonate, as described in Example 2.

EXAMPLE 9

A mixture of 5 - (3-hydroxypropoxy) - chromone - 2 - carboxylic acid and thionyl chloride are reacted together by heating gently for a period of about 2 hours as described in Example 1. The reaction product is separated by cooling and pouring the reaction mixture into ice-water followed by filtration of the product which is recrystallized to yield 5 - (3-chloropropoxy)-chromone-2-carboxylic acid. This acid is then converted to the sodium salt by reaction with sodium bicarbonate as described in Example 2.

EXAMPLE 10

Following the procedure of Example 1, 5-(2-hydroxybutoxy)-chromone-2-carboxylic acid is converted to 5-(2-chlorobutoxy)-chromone-2-carboxylic acid by reaction with thionyl chloride. The acid is subsequently converted to its sodium salt as described in Example 2.

EXAMPLE 11

A mixture of 8-ethyl-5-(2-hydroxyethoxy)-chromone-2-carboxylic acid and thionyl chloride is gently warmed on a steam bath for several hours. The reaction mixture is then cooled and poured into ice-water whereupon a solid separates. The solid is filtered off and recrystallized to yield 8-ethyl-5-(2-chloroethoxy) - chromone - 2 - carboxylic acid. The acid is then reacted with sodium bicarbonate, as described in Example 2, to yield sodium 8-ethyl-5-(2-chloroethoxy)-chromone-2-carboxylate.

EXAMPLE 12

To a solution of ethyl 5-(2-hydroxyethoxy)-chromone-2-carboxylate (0.7 part) in chloroform (20 parts) is added phosphorus oxychloride (1.2 parts) followed by pyyridine (0.58 part) and this mixture is warmed on a steam-bath for 1½ hours. After keeping overnight the mixture is poured into ice-water with stirring and the two layers are separated. The aqueous layer is washed with more chloroform and the chloroform solutions are then combined and dried over sodium sulphate.

Removal of the sodium sulphate by filtration, and the chloroform by evaporation, leaves a solid which is crystallized from an ethanol-water mixture to yield 0.3 part of ethyl 5-(2-chloroethoxy) - chromone-2-carboxylate melting between 110–112.5° C.

Analysis.—For $C_{14}H_{13}ClO_5$. Found: C, 57.1%; H, 4.2%. Requires: C, 56.7%; H, 4.4%. Hydrolysis of this ester yields the acid described in Example 1.

EXAMPLE 13

2,6 - dihydroxyacetophenone (10 parts), benzyl bromide (11.5 parts) and anhydrous potassium carbonate (4.6 parts) are refluxed in dry acetone (70 parts) for 66 hours. After cooling the liquid is filtered and the filtrate is evaporated to dryness. The residue is dissolved in a benzene-chloroform solution which is filtered and washed with water; after drying over sodium sulphate, the drying agent and solvent are removed by evaporation and the residue is crystallized from light petroleum (B.P. 60–80° C.) to yield 2 - benzyloxy-6-hydroxyacetophenone (5.7 parts) melting between 104 and 107° C.

Analysis.— For $C_{15}H_{14}O_3$. Found: C, 75.0%; H, 5.72%. Requires: C, 74.36%; H, 5.83%.

To a solution of sodium ethoxide from sodium (2.8 parts) in dry ethanol (30 parts) in dry ether (70 parts) is added dropwise with stirring a solution of 2-benzyloxy-6-hydroxyacetophenone (6.44 parts) in diethyl oxalate (9.3 parts), dry ethanol (30 parts) and dry ether (70 parts). This mixture is then stirred and refluxed for a further 5 hours, then poured into ether (500 parts) and extracted into water (3× 100 parts). The aqueous extract is then acidified and the product is extracted with chloroform (3× 100 parts) and dried over sodium sulphate. The drying agent and solvent are then removed, the residue is taken up in ethanol (30 parts) containing a few drops of concentrated hydrochloric acid and boiled for a few minutes; on cooling a crystalline solid (5.6 parts) separates out. This material is redissolved in chloroform and washed in ice cold sodium bicarbonate solution. The chloroform solution, after drying with sodium sulphate, is evaporated and the residue is recrystallized from light petroleum (B.P. 60–80° C.) to yield 3.5 parts of ethyl 5-benzyloxychromone-2-carboxylate melting between 117 and 118° C.

*Analysis.*—For $C_{19}H_{16}O_5$. Found: C, 70.2%; H, 4.99%. Requires: C, 70.36%; H, 4.98%.

Acidification of the sodium bicarbonate solution with dilute hydrochloric acid results in a solid precipiating which is filtered off and crystallized from a mixture of ethanol-water to obtain 5 - benzyloxychromone - 2 - carboxylic acid (1.4 parts) melting between 184 and 185.5° C.

*Analysis.*—For $C_{17}H_{12}O_5$: Found: C, 68.5%; H, 4.17%. Requires: C, 68.91%; H, 4.08%.

EXAMPLE 14

The acid from Example 13 is converted to sodium 5-benzyloxy-chromone-2-carboxylate by the method of Example 2.

EXAMPLE 15

2,6-dihydroxy-4-methyl-acetophenone and benzyl bromide are refluxed together in the presence of potassium carbonate and dry acetone and the reaction product isolated as described in Example 13, to give 2-benzyloxy-6-hydroxy-4-methyl-acetophenone.

The 2-benzyloxy-6-hydroxy-4-methyl-acetophenone is then reacted with diethyl oxalate in the presence of sodium ethoxide as described in Example 13 to yield ethyl 5-benzyloxy-7-methyl-chromone-2-carboxylate which is subsequently converted to the acid and finally to the sodium salt.

EXAMPLE 16

To a solution of 2,6-dihydroxy-4-methylacetophenone in diethyl ether is added a solution of sulphuryl chloride in diethyl ether. A yellow solid separates immediately. The mixture is left at room temperature for about one hour, filtered and washed with diethyl ether to give 3,5-dichloro-2,6-dihydroxy-4-methylacetophenone.

The 3,5-dichloro-2,6-dihydroxy-4-methylacetophenone is then reacted with benzyl bromide, following the procedure of Example 13, to give 6-benzyloxy-3,5-dichloro-2-hydroxy-4-methylacetophenone which is subsequently converted to ethyl 5-benzyloxy-6,8-dichloro-7-methyl-chromone -2-carboxylate. The ester is then converted to the corresponding acid by treatment with dilute hydrochloric acid. The acid is then converted to the sodium salt by reaction with sodium bicarbonate as described in Example 2.

EXAMPLE 17

Following the procedure of Example 13, 2,4,6-trihydroxyacetophenone and benzyl bromide are reacted together in the presence of potassium carbonate to yield 2,4-dibenzyloxy-6-hydroxyacetophenone.

A mixture of 2,4-dibenzyl-6-hydroxyacetophenone acid and diethyl oxalate is then reacted in the presence of sodium ethoxide to yield ethyl 5,7-dibenzyloxy-chromone-2-carboxylate by the method described in Example 13. The ester is subsequently hydrolyzed to the acid and the acid converted to the sodium salt by the method of Example 2.

EXAMPLE 18

2,6 - dihydroxy-3-ethylacetophenone is reacted with benzyl bromide, by the method described in Example 13, to give 6-benzyl-2-hydroxy-3-ethylacetophenone which is then reacted with diethyl oxalate in the presence of sodium ethoxide following the method of Example 13 to yield ethyl 5-benzyloxy-8-ethyl-chromone-2-carboxylate. The ester is then hydrolyzed to the acid and the acid converted to the sodium salt by the method of Example 2.

EXAMPLE 19

2,6-dihydroxyacetophenone (10 parts), 4-bromobut-1-ene (20.5 parts) anhydrous potassium carbonate (5.5 parts) are heated on a steam bath for 44 hours in 40 parts of dimethylformamide. Further amounts of the 4-bromobut-1-ene are added after 2 hours (5 parts). The reaction mixture is cooled and poured into water (150 parts) and this solution is extracted with ether. The ethereal extract is dried over sodium sulphate; removal of the drying agent by filtration and the solvent by evaporation gives a dark oil. The extraction of this oil with boiling light petroleum (B.P. 60–80° C.) yields a residue of crude 2,6-dihydroxyacetophenone (5 parts). The petroleum extract was concentrated and a solid is obtained which is crystallized from ethanol with acetone-solid carbon dioxide cooling to yield 2-(but-3-enoxy)-6-hydroxyacetophenone (6 parts) melting between 59 and 60° C.

*Analysis.*—For $C_{12}H_{14}O_3$. Found: C, 70.1%; H, 6.91%. Requires: C, 69.88%; H, 6.84%.

2-(but-3-enoxy)-6-hydroxyacetophenone (4 parts) is condensed with diethyl oxalate (8.4 parts), with sodium ethoxide (from 1.35 parts of sodium in 60 parts of ethanol) as catalyst, and dry ether (80 parts) as solvent using the method as described in Example 13. This yields the chromone ester (2.5 parts) as a red oil which is not crystallized. Hydrolysis of the above oil is effected by shaking and heating on a steam-bath with sodium bicarbonate (0.73 part) in water (30 parts) until the solution is homogeneous. After treating with charcoal and filtering, the filtrate is acidified with hydrochloric acid and chilled overnight. The product which separates is filtered off and recrystallized from an ethanol-water mixture to yield 5-(but-3-enoxy)-chromone-2-carboxylic acid (0.2 part) melting between 186 and 187° C.

*Analysis.*—For $C_{14}H_{12}O_5$. Found: C, 64.4%; H, 4.54%. Requires: C, 64.61%; H, 4.65%.

EXAMPLE 20

The acid from Example 17 is converted to sodium 5-(but-3-enoxy)-chromone-2-carboxylate by the method described in Example 2.

EXAMPLE 21

Following the procedure of Example 19, 2,6-dihydroxy-4-methylacetophenone is reacted with 4-bromobut-1-ene to give 2 - (but-3-enoxy)-4-methyl-6-hydroxy-acetophenone which is then reacted with diethyl oxalate, following the procedure of Example 13, to give ethyl 5-(but-3-enoxy) - 7 - methyl-chromone-2-carboxylate. The ester is then hydrolized as described in Example 19 and the resultant acid converted to the sodium salt by the method of Example 2.

EXAMPLE 22

The procedure of Example 19 is followed except that 3,5 - dichloro - 2,6-dihydroxy-4-methylacetophenone (prepared as described in Example 16) is used in place of 2,6-dihydroxyacetophenone The 6 - (but - 3- -enoxy) - 3,5-dichloro-2-hydroxy-4-methylacetophenone obtained from the reaction of 3,5 - dichloro - 2,6-dihydroxy-4-methyl-acetophenone and 4 bromobut-1-ene is reacted with diethyl oxalate to give ethyl 5-(but-3-enoxy)-6,8-dichloro-7-methyl-chromone-2-carboxylate which is subsequently hydrolized and the resultant acid converted to the sodium salt by reaction with sodium bicarbonate by the method of Example 2.

EXAMPLE 23

2,4,6-trihydroxy-acetophenone and 4-bromobut-1-ene are reacted together as described in Example 19 to give 2,4 - bis(but - 3-enoxy)-1-hydroxy-acetophenone which is then condensed with diethyl oxalate, as described in Example 13, to give ethyl 5,7-bis(but-3-enoxy)-chromone-2-carboxylate. This ester is then hydrolized to the acid as described in Example 19 and the acid converted to the sodium salt by reaction with sodium bicarbonate.

EXAMPLE 24

2,6-dihydroxy-3-ethyl-acetophenone is reacted with 4-bromobut-1-ene, as described in Example 19, to give 6-(but-3-enoxy)-2-hydroxy-3-ethyl-acetophenone.

6-(but-3-enoxy)-2-hydroxy-3-ethylacetophenone in admixture with diethyl oxalate is run into an ethanolic solution of sodium ethoxide in ethanol, the reaction mixture refluxed, and the resultant condensation product separated as in Example 13 to give ethyl-5-(but-3-enoxy)-8-ethyl-chromone-2-carboxylate. This ester is then hydrolized to the acid as described in Example 19 and the acid converted to the sodium salt by the method of Example 2.

EXAMPLE 25

A mixture of 15.2 parts of 2,6-dihydroxyacetophenone, 12.1 parts of allyl bromide and 13.8 parts of anhydrous potassium carbonate in 100 parts of dry acetone was heated under reflux for 7 hours. The acetone was then distilled off and water, dilute hydrochloric acid and diethyl ether were added.

The ethereal layer was separated, dried over sodium sulphate, filtered and evaporated to dryness to leave a yellow oil.

This oil was chromatographed on alumina using diethyl ether as eluant. Evaporation of the diethyl ether gave a yellow solid which was crystallized from light petroleum, boiling range 40–60° C., to give 15 parts of 2-allyloxy-6-hydroxyacetophenone as yellow needles, melting point 45.5–46.5° C.

Analysis.—For $C_{11}H_{12}O_3$. Found: C, 68.4%; H, 5.95%. Requires: C, 68.73%; H, 6.29%.

To a solution of sodium (0.6 parts) in dry ethanol (50 parts) and dry ether (100 parts) was added with stirring a solution of 2-allyloxy-6-hydroxyacetophenone (2 parts) and ethyl oxalate (5 parts) in dry ethanol (25 parts). This mixture was then stirred and refluxed for 5 hours, and then poured into ether (500 parts). After extracting into water (3× 60 parts), the aqueous extract was acidified with concentrated hydrochloric acid and extracted into chloroform (3× 40 parts). After drying over sodium sulphate the chloroform was removed by evaporation and the residual oil was taken up in ethanol (30 parts) containing five drops of concentrated hydrochloric acid. This solution was boiled for five minutes and on cooling ethyl 5-allyloxy-chromone-2-carboxylate (0.3 part) separated and this material was crystallized from ethanol/water as white crystals; melting point 122–123° C.

Analysis.—For $C_{15}H_{14}O_5$. Found: C, 65.5%; H, 5.1%. Requires: C, 65.7%; H, 5.1%.

The above ester (0.3 part) and sodium bicarbonate (0.5 parts) in water (10 parts) was heated with stirring on a steam-bath until the solution was complete. On cooling and acidifying with dilute hydrochloric acid, 5-allyloxy-chromone-2-carboxylic acid (0.18 part) was obtained and this material was purified by dissolving in sodium bicarbonate and reprecipitating using dilute hydrochloric acid, to give a white crystalline solid; melting point 175–175.5° C.

Analysis.—For $C_{13}H_{10}O_5$. Found: C, 64.0%; H, 3.9%. Requires: C, 63.4%; H, 4.1%.

This acid was mixed with an equivalent of sodium bicarbonate and dissolved in water; after filtering, the solution was freeze-dried to yield the desired sodium salt.

What is claimed is:

1. A compound selected from the group consisting of chromone derivatives of the formula:

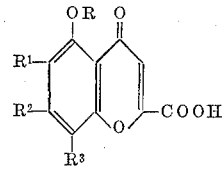

and physiologically acceptable salts, esters and amides thereof, in which R is a member selected from the group consisting of halo (lower) alkyl, lower alkenyl, and phenyl (lower) alkyl, and $R^1$, $R^2$ and $R^3$ are each selected from the group consisting of hydrogen, halogen, lower alkyl and OR in which R has the meaning defined above, or $R^1$ and $R^2$ or $R^2$ and $R^3$ together with the adjacent carbon atoms form a saturated or unsaturated carbocyclic ring of no more than six carbons, said salts being selected from the group consisting of alkali metal salts, alkaline earth metal salts, and salts with piperidine, triethanolamine and diethylaminoethylamine, said amides being selected from the group derived from ammonia and glycine, and the esters being lower alkyl esters.

2. A compound as claimed in claim 1, in the form of an ammonium salt.

3. A compound as claimed in claim 1, in the form of an alkali metal salt.

4. A compound as claimed in claim 1, in the form of an alkaline earth metal salt.

5. A compound as claimed in claim 1, in the form of a salt with piperidine or triethanolamine or diethylaminoethyl amine.

6. A compound according to claim 1 in which all of $R^1$, $R^2$ and $R^3$ are hydrogen.

7. 5-(2-chloroethoxy)-chromone-2-carboxylic acid and physiologically acceptable salts, esters and amides thereof, said salts being selected from the group consisting of alkali metal salts, alkaline earth metal salts, and salts with piperidine, triethanolamine and diethylaminoethylamine, said amides being selected from the group derived from ammonia, and glycine, and the esters being lower alkyl esters.

8. 5-benzyloxychromone-2-carboxylic acid and physiologically acceptable salts, esters and amides thereof, said salts being selected from the group consisting of alkali metal salts, alkaline earth metal salts, and salts with piperidine, triethanolamine and diethylaminoethylamine, said amides being selected from the group derived from ammonia, and glycine, and the esters being lower alkyl esters.

9. 5-(buten-3-enoxy)-chromone-2-carboxylic acid and physiologically acceptable salts, esters and amides thereof, said salts being selected from the group consisting of alkali metal salts, alkaline earth metal salts, and salts with piperidine, triethanolamine and diethylaminoethylamine, said amides being selected from the group derived from ammonia and glycine, and the esters being lower alkyl esters.

References Cited

UNITED STATES PATENTS

| 3,427,324 | 2/1969 | Fitzmaurice | 260—345.2 XR |
| 3,419,578 | 12/1968 | Fitzmaurice et al. | 260—345.2 |
| 3,121,096 | 2/1964 | Joly et al. | 260—345.2 |
| 3,358,000 | 12/1967 | Vincent | 260—345.2 |

OTHER REFERENCES

Dean, "Naturally Occurring Oxygen Ring Compounds" Butterworth & Co. (Publishers) Ltd., London (1963), pp. 372–3.

HENRY R. JILES, Primary Examiner

J. M. FORD, Assistant Examiner

U.S. Cl. X.R.

260—345.2. 345.5, 473, 521, 592, 999